United States Patent
Choi et al.

(10) Patent No.: US 11,395,007 B2
(45) Date of Patent: Jul. 19, 2022

(54) METHOD FOR SIGNALING DEPENDENT AND INDEPENDENT PICTURE HEADER

(71) Applicant: TENCENT AMERICA LLC, Palo Alto, CA (US)

(72) Inventors: Byeongdoo Choi, Palo Alto, CA (US); Stephan Wenger, Hillsborough, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/071,479

(22) Filed: Oct. 15, 2020

(65) Prior Publication Data

US 2021/0185359 A1     Jun. 17, 2021

Related U.S. Application Data

(60) Provisional application No. 62/947,226, filed on Dec. 12, 2019, provisional application No. 62/947,236, filed on Dec. 12, 2019.

(51) Int. Cl.
| | |
|---|---|
| *H04N 19/70* | (2014.01) |
| *H04N 19/187* | (2014.01) |
| *H04N 19/172* | (2014.01) |
| *H04N 19/46* | (2014.01) |
| *H04N 19/50* | (2014.01) |

(52) U.S. Cl.
CPC .......... *H04N 19/70* (2014.11); *H04N 19/172* (2014.11); *H04N 19/46* (2014.11); *H04N 19/50* (2014.11)

(58) Field of Classification Search
CPC ...... H04N 19/70; H04N 19/172; H04N 19/46; H04N 19/50; H04N 19/51
USPC ....................................... 375/240.12, 240.11
See application file for complete search history.

(56) References Cited

U.S. PATENT DOCUMENTS

| | | | |
|---|---|---|---|
| 2008/0317124 A1* | 12/2008 | Cho ..................... | H04N 19/597 375/240.08 |
| 2012/0230433 A1* | 9/2012 | Chen ..................... | H04N 19/70 375/240.25 |
| 2014/0003491 A1* | 1/2014 | Chen ..................... | H04N 19/13 375/240.02 |

(Continued)

OTHER PUBLICATIONS

Benjamin Bross et al., "Versatile Video Coding (Draft 6)", Joint Video Experts Team (JVET) of ITU-T SG 16 WP 3 and ISO/IEC JTC 1/SC 29/WG 11, Jul. 2019, 439 pages, JVET-O2001-vE.

*Primary Examiner* — Albert Kir

(74) *Attorney, Agent, or Firm* — Sughrue Mion, PLLC

(57) ABSTRACT

A method of reconstructing in a decoder a coded enhancement layer picture, is performed by at least one processor and includes decoding at least one independent picture header of a coded picture of a reference layer, the coded picture of the reference layer being referenced by the coded enhancement layer picture, and decoding a dependent picture header of the coded enhancement layer picture. The method further includes performing picture header prediction including either one or both of predicting at least one value of at least one syntax element of the dependent picture header from at least one value of at least one corresponding syntax element of the at least one independent picture header; and inferring at least one value of a non-present syntax element of the dependent picture header to be equal to at least one value of a present syntax element of the at least one independent picture header.

20 Claims, 13 Drawing Sheets

(56) References Cited

U.S. PATENT DOCUMENTS

| | | | |
|---|---|---|---|
| 2015/0156501 A1* | 6/2015 | Hannuksela | H04N 19/70 375/240.12 |
| 2015/0195577 A1* | 7/2015 | Hannuksela | H04N 19/44 375/240.25 |
| 2021/0195248 A1* | 6/2021 | Coban | H04N 19/174 |
| 2021/0314624 A1* | 10/2021 | Coban | H04N 19/70 |

* cited by examiner

| picture_header_rbsp( ) { | Descriptor |
|---|---|
| ... | |
| ph_pic_parameter_set_id | ue(v) |
| ... | |
| ph_dependent_flag | u(1) |
| if( !ph_dependent_flag ) { | |
| if( sps_poc_msb_flag ) { | |
| ph_poc_msb_present_flag | u(1) |
| if( ph_poc_msb_present_flag ) | |
| poc_msb_val | u(v) |
| } | |
| if( sps_subpic_id_present_flag && !sps_subpic_id_signalling_flag ) { | |
| ph_subpic_id_signalling_present_flag | u(1) |
| if( ph_subpic_id_signalling_present_flag ) { | |
| ph_subpic_id_len_minus1 | ue(v) |
| for( i = 0; i <= sps_num_subpics_minus1; i++ ) | |
| ph_subpic_id[ i ] | u(v) |
| } | |
| ... | |
| } | |

FIG. 7

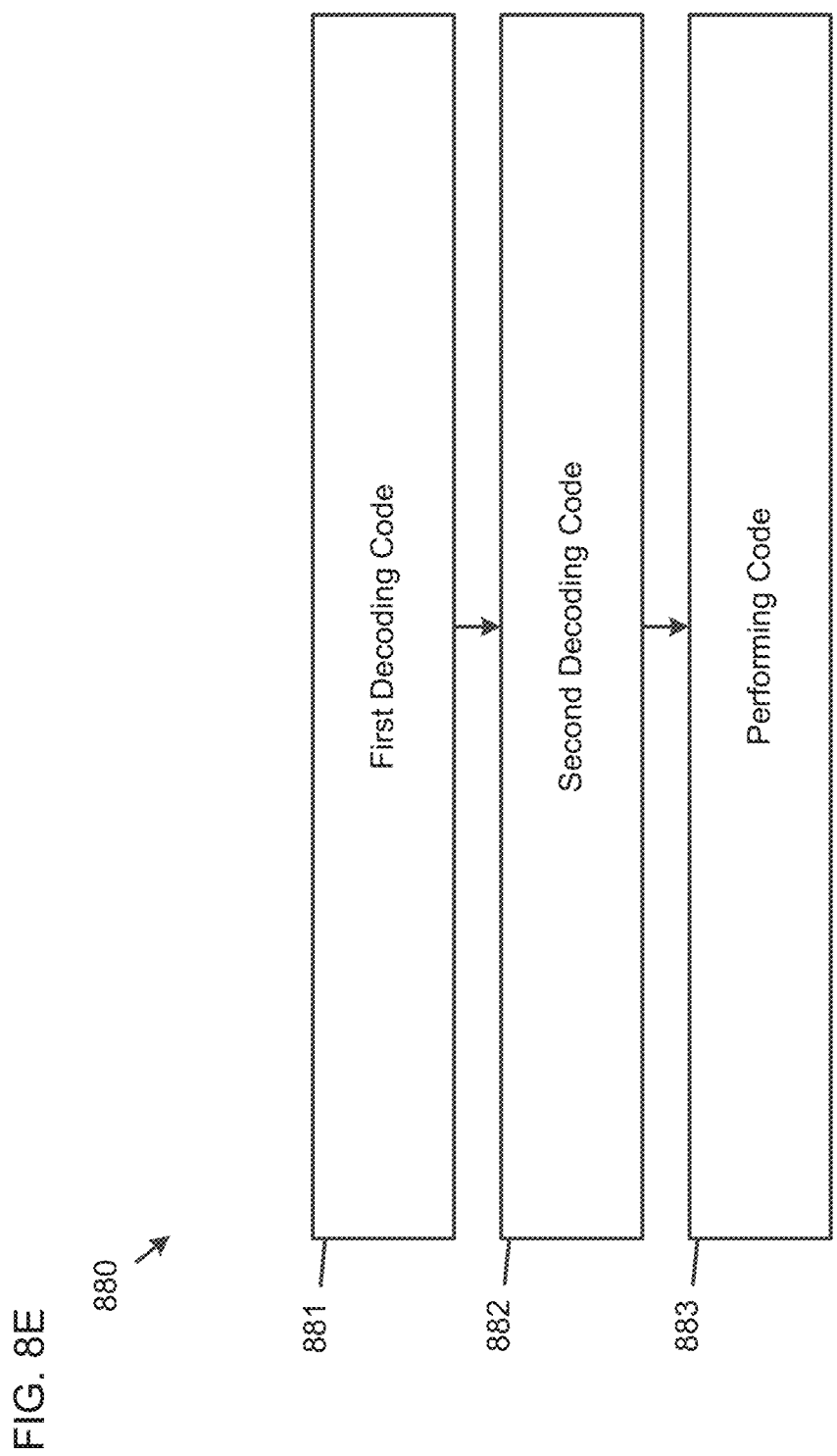

METHOD FOR SIGNALING DEPENDENT AND INDEPENDENT PICTURE HEADER

CROSS-REFERENCE TO RELATED APPLICATION

This application claims priority from U.S. Provisional Patent Application Nos. 62/947,236 and 62/947,226, filed on Dec. 12, 2019, in the U.S. Patent and Trademark Office, which are incorporated herein by reference in their entireties.

BACKGROUND

1. Field

Methods and apparatuses consistent with embodiments relate to video coding and decoding, and more particularly, a method and an apparatus for signaling one or more independent picture headers and one or more dependent picture headers in an access unit of a coded video sequence.

2. Description of Related Art

Video coding and decoding using inter-picture prediction with motion compensation has been known for decades. Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

The concept of dividing a coded video bitstream into packets for transportation over packet networks has been in use for decades. Early on, video coding standards and technologies were in their majority optimized for bot-oriented transport, and defined bitstreams. Packetization occurred in system layer interfaces specified, for example, in Real-time Transport Protocol (RTP) payload formats. With the advent of Internet connectivity suitable for mass-use of video over the Internet, the video coding standards reflected that prominent use case through the conceptual differentiation of a video coding layer (VCL) and a network abstraction layer (NAL). NAL units were introduced in H.264 in 2003, and have been retained in certain video coding standards and technologies since then with only slight modifications.

A NAL unit can, in many cases, be seen as the smallest entity on which a decoder can act upon without necessarily having decoded all preceding NAL units of a coded video sequence. Insofar, NAL units enable certain error resilience technologies as well as certain bitstream manipulation techniques, to include bitstream pruning, by Media Aware Network Elements (MANEs) such as Selective Forwarding Units (SFUs) or Multipoint Control Units (MCUs).

FIG. 1 depicts relevant parts of the syntax diagram of NAL unit headers in accordance with H.264 (101) and H.265 (102), in both cases without any of their respective extensions. In both cases, the forbidden_zero_bit is a zero bit used for start code emulation prevention in certain system layer environments. The nal_unit type syntax element refers to the type of data a NAL unit carries, which can be, for example, one of certain slice types, parameter set types, Supplementary Enhancement Information (SEI) message, and so on. The H.265 NAL unit header further comprises nuh_layer_id and nuh_temporal_id_plus1, which indicate the spatial/SNR and temporal layer of a coded picture the NAL unit belongs to.

It can be observed that the NAL unit header includes only easily parseable fixed length codewords, that do not have any parsing dependency to other data in the bitstream such as, for example, other NAL unit headers, parameter sets, and so on. As NAL unit headers are the first octets in a NAL unit, MANEs can easily extract them, parse them, and act on them. Other high level syntax elements, for example slice or tile headers, in contrast, are less easily accessible to MANEs as they may require keeping parameter set context and/or the processing of variable length or arithmetically coded codepoints.

It can further be observed that the NAL unit headers as shown in FIG. 1 do not include information that can associate a NAL unit to a coded picture that is composed of a plurality of NAL units (such as, for example, comprising multiple tiles or slices, at least some of which being packetized in individual NAL units).

Certain transport technologies such as RTP (RFC 3550), MPEG-system standards, ISO file formats, and so on, may include certain information, often in the form of timing information such as presentation time (in case of MPEG and ISO file format) or capture time (in case of RTP) that can be easily accessible by MANEs and can help associating their respective transport units with coded pictures. However, the semantics of these information can differ from one transport/storage technology to another, and may have no direct relationship with the picture structure used in the video coding. Accordingly, these information may be, at best, heuristics and may also not be particularly well suited to identify whether or not NAL units in a NAL unit stream belong to the same coded picture.

The conventional video syntax redundantly signals parameters referenced by one or more slices or VCL NAL units.

SUMMARY

According to embodiments, a method of reconstructing in a decoder a coded enhancement layer picture, is performed by at least one processor and includes decoding at least one independent picture header of a coded picture of a reference layer, the coded picture of the reference layer being referenced by the coded enhancement layer picture, and decoding a dependent picture header of the coded enhancement layer picture. The method further includes performing picture header prediction including either one or both of predicting at least one value of at least one syntax element of the dependent picture header from at least one value of at least one corresponding syntax element of the at least one independent picture header; and inferring at least one value of a non-present syntax element of the dependent picture header to be equal to at least one value of a present syntax element of the at least one independent picture header.

According to embodiments, an apparatus for reconstructing in a decoder a coded enhancement layer picture, includes at least one memory configured to store computer program code, and at least one processor configured to access the at least one memory and operate according to the computer program code. The computer program code includes first decoding code configured to cause the at least one processor to decode at least one independent picture header of a coded picture of a reference layer, the coded picture of the reference layer being referenced by the coded enhancement layer picture, and second decoding code configured to cause the at least one processor to decode a dependent picture header of the coded enhancement layer picture. The computer program code further includes performing code configured to cause the at least one processor to perform picture header prediction including either one or both of predicting at least one value of at least one syntax element of the dependent picture header from at least one value of at least one corresponding syntax element of the at least one independent picture header, and inferring at least one value of a non-present syntax element of the dependent picture header to be equal to at least one value of a present syntax element of the at least one independent picture header.

According to embodiments, a non-transitory computer-readable storage medium stores instructions that cause at least one processor to decode at least one independent picture header of a coded picture of a reference layer, the coded picture of the reference layer being referenced by the coded enhancement layer picture, and decode a dependent picture header of the coded enhancement layer picture. The instructions further cause the at least one processor to perform picture header prediction including either one or both of predicting at least one value of at least one syntax element of the dependent picture header from at least one value of at least one corresponding syntax element of the at least one independent picture header, and inferring at least one value of a non-present syntax element of the dependent picture header to be equal to at least one value of a present syntax element of the at least one independent picture header.

BRIEF DESCRIPTION OF THE DRAWINGS

FIG. 7 is a schematic illustration of a picture header with an independent mode and a dependent mode, according to embodiments.

FIG. 8E is a block diagram of an apparatus for signaling a dependent picture header and an independent picture header, according to embodiments.

DETAILED DESCRIPTION

Figure 1:
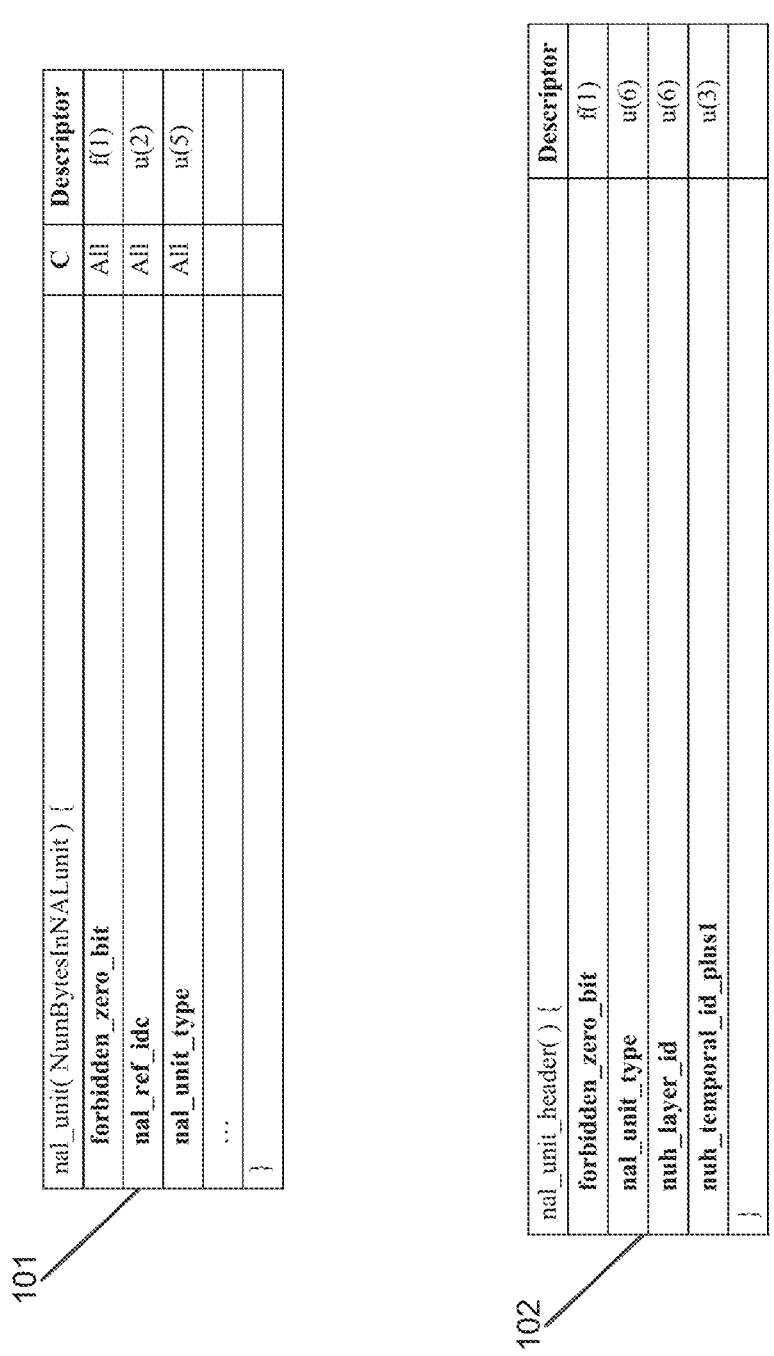
FIG. 1 is a schematic illustration of NAL unit headers in accordance with H.264 and H.265.
Figure 2:
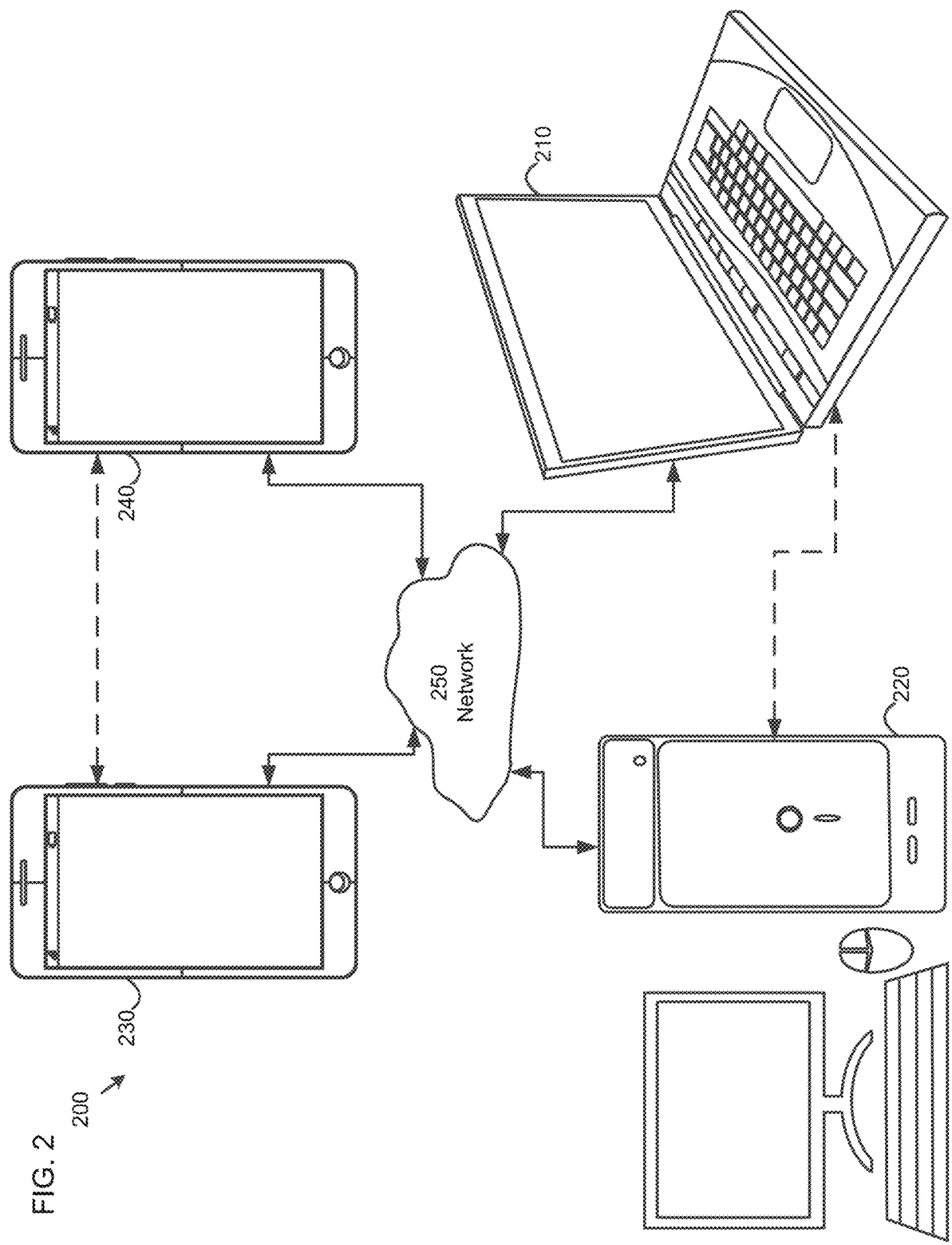
FIG. 2 is a simplified block diagram of a communication system according to embodiments.

FIG. 2 is a simplified block diagram of a communication system (200) according to embodiments. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of embodiments are not so limited. Embodiments find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of embodiments unless explained herein below.

Figure 3:
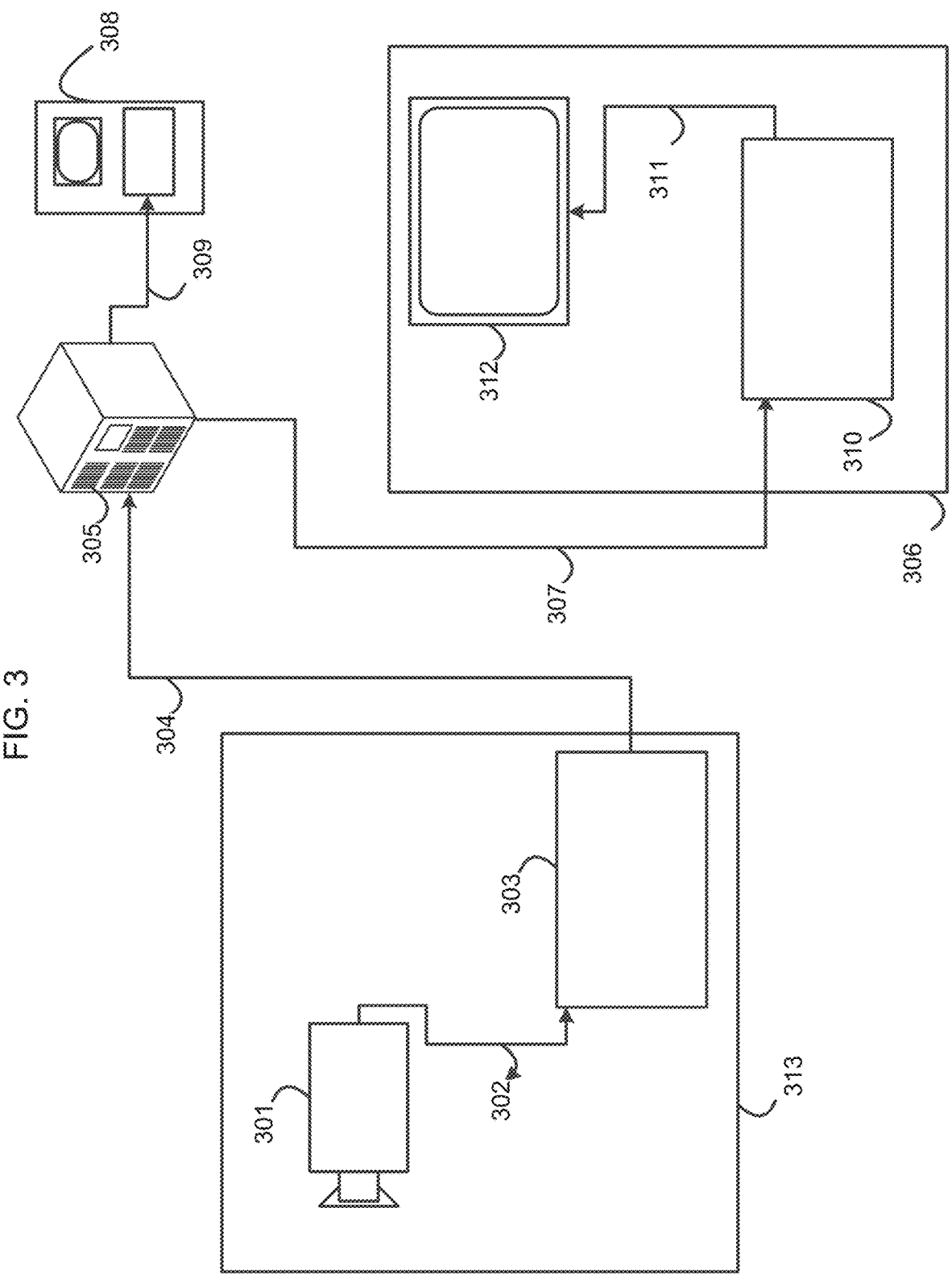
FIG. 3 is a diagram of a placement of a video encoder and a video decoder in a streaming environment, according to embodiments.

FIG. 3 is a diagram of a placement of a video encoder and a video decoder in a streaming environment, according to embodiments. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313) that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310), which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as VVC. The disclosed subject matter may be used in the context of VVC.

Figure 4:
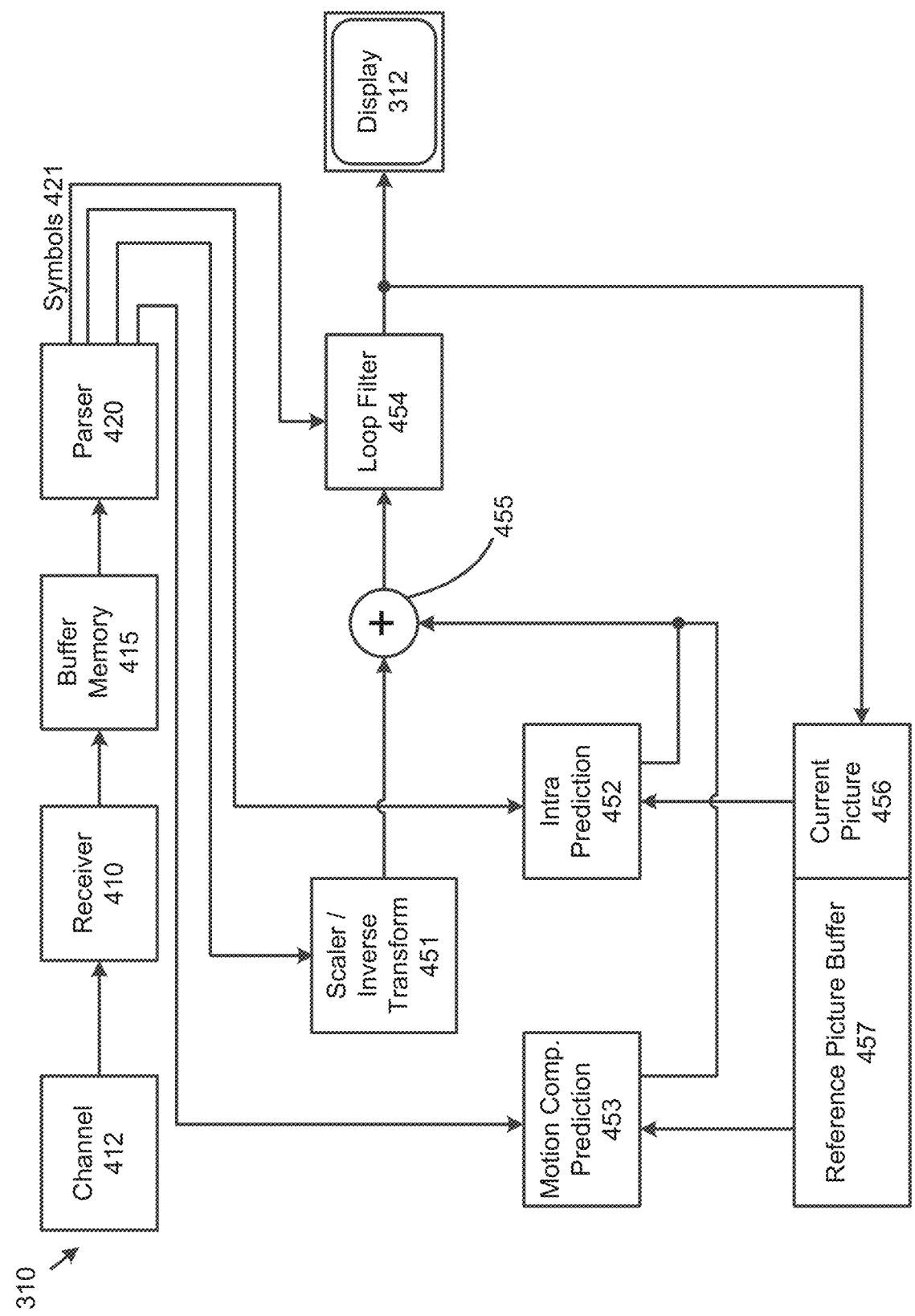
FIG. 4 is a functional block diagram of a video decoder according to embodiments.

FIG. 4 is a functional block diagram of a video decoder (310) according to embodiments.

A receiver (410) may receive one or more codec video sequences to be decoded by the decoder (310); in the same or embodiments, one coded video sequence at a time, where the decoding of each coded video sequence is independent from other coded video sequences. The coded video sequence may be received from a channel (412), which may be a hardware/software link to a storage device, which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of SEI messages or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction unit (452), or a loop filter unit (454).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks including sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (454). Video compression technologies can include in-loop filter technologies that are controlled by parameters included in the coded video bitstream and made available to the loop filter unit (454) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (454) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (456) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In embodiments, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 5:
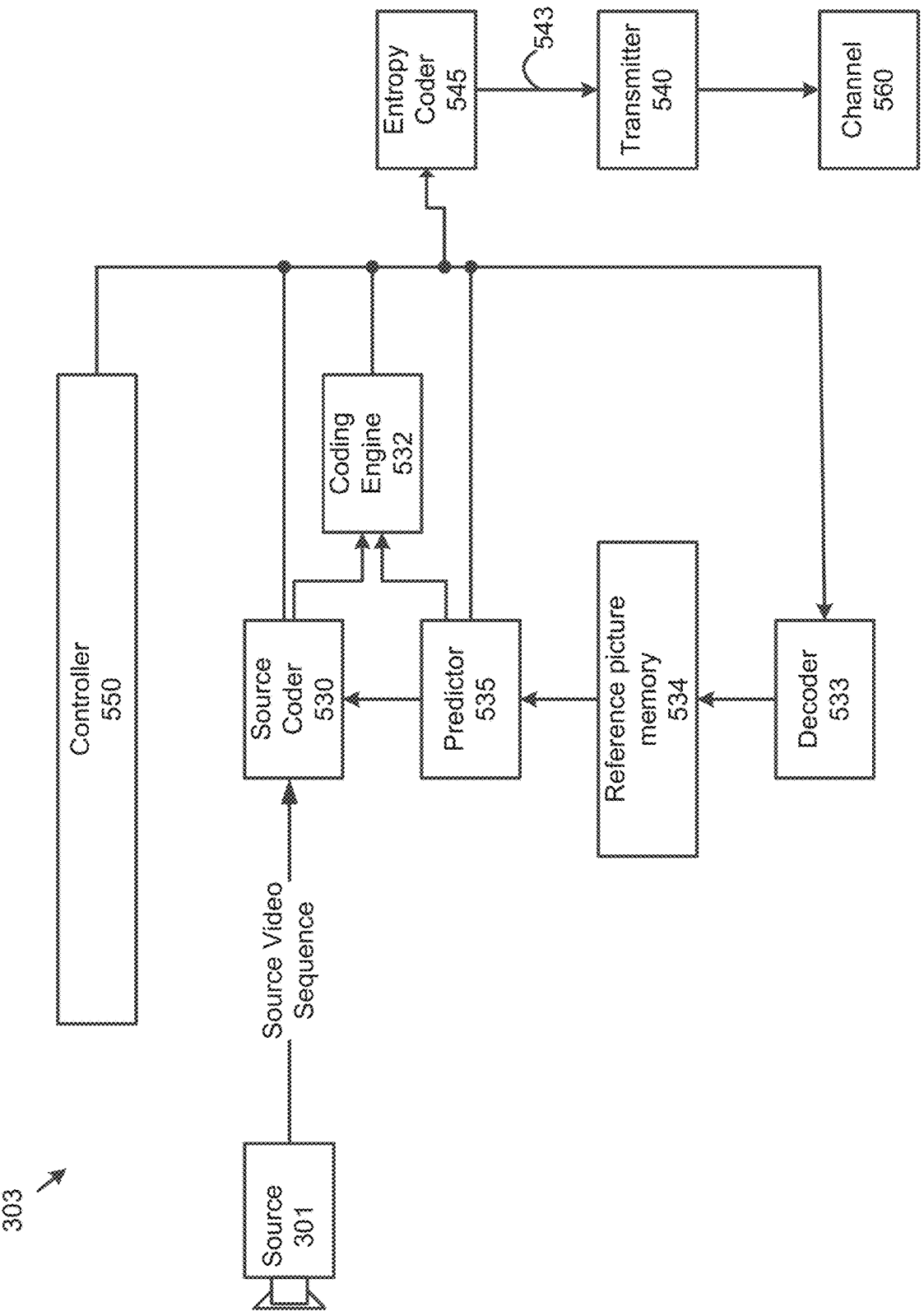
FIG. 5 is a functional block diagram of a video encoder according to embodiments.

FIG. 5 is a functional block diagram of a video encoder (303) according to embodiments.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can include one or more samples depending on the sampling structure, color space, etc. in use. A person skilled in the art can readily understand the relationship between pixels and samples. The description below focuses on samples.

According to embodiments, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 4), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device that may store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In embodiments, the transmitter (540) may transmit additional data with the encoded video. The video coder (530) may include such data as part of the coded video sequence. Additional data may include temporal/spatial/SNR enhancement layers, other forms of redundant data such as redundant pictures and slices, Supplementary Enhancement Information (SEI) messages, Visual Usability Information (VUI) parameter set fragments, and so on.

In one embodiment, a PH may contain parameters (or syntax elements) that apply to all slices of a coded picture, as an NAL unit. For example, a PH NAL unit may contain information about picture type, picture order count and coding mode whose values are identical to all slices of a coded picture.

Figure 6:
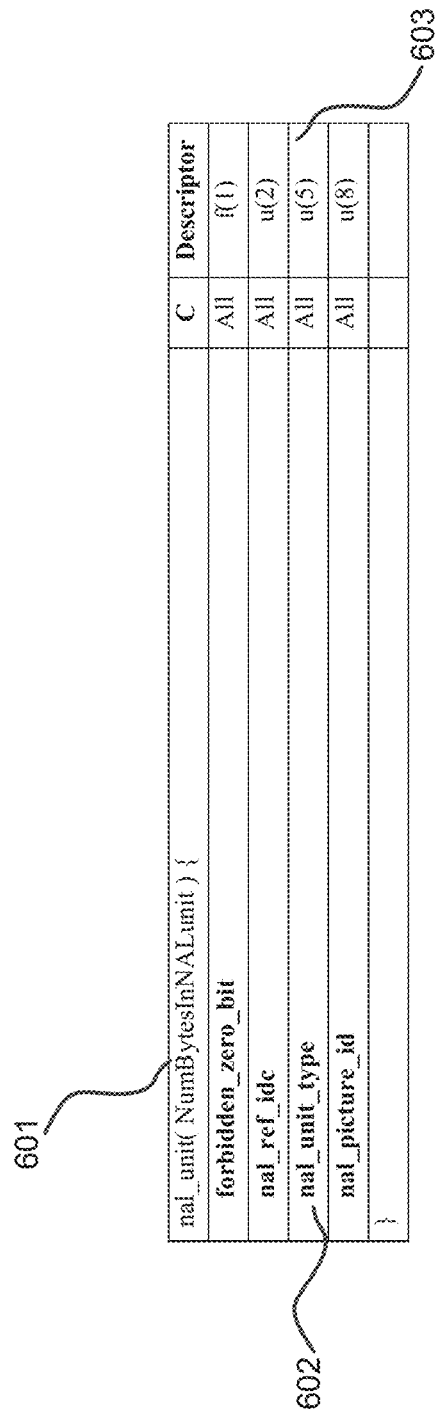
FIG. 6 is a schematic illustration of a NAL unit header, according to embodiments.

FIG. 6 is a schematic illustration of a NAL unit header (601), according to embodiments.

Referring to FIG. 6, a NAL unit may include a body (602) and a corresponding descriptor (603) that include information about picture type, picture order count and coding mode whose values are identical to all slices of a coded picture.

In the same or another embodiment, a PU is a set of NAL units that are associated with each other according to a specified classification rule, are consecutive in decoding order, and contain exactly one coded picture. A PU may consist of one PH NAL unit, one coded picture, which comprises of one or more VCL NAL units, and zero or more non-VCL NAL units.

In the same or another embodiment, an AU may consist of zero or one AU delimiter NAL unit and one or more PUs in increasing order of nuh_layer_id. The first AU in the bitstream may start with the first NAL unit of the bitstream. There may be at most one AU delimiter NAL unit in an AU.

In the same embodiment, the first VCL NAL unit of a picture may be the first VCL NAL unit that follows the PH NAL unit in decoding order of the picture. A VCL NAL unit may be the first VCL NAL unit of an AU (and consequently the picture containing the first VCL NAL unit is the first picture of the AU) when the VCL NAL unit is the first VCL NAL unit of a picture and one or more the following conditions are true:

The value of nuh_layer_id of the VCL NAL unit is less than the nuh_layer_id of the previous picture in decoding order.

The value of slice_pic_order_cnt_lsb of the VCL NAL unit differs from the PicOrderCntVal of the previous picture in decoding order.

PicOrderCntVal derived for the VCL NAL unit differs from the PicOrderCntVal of the previous picture in decoding order.

Figure 8A:
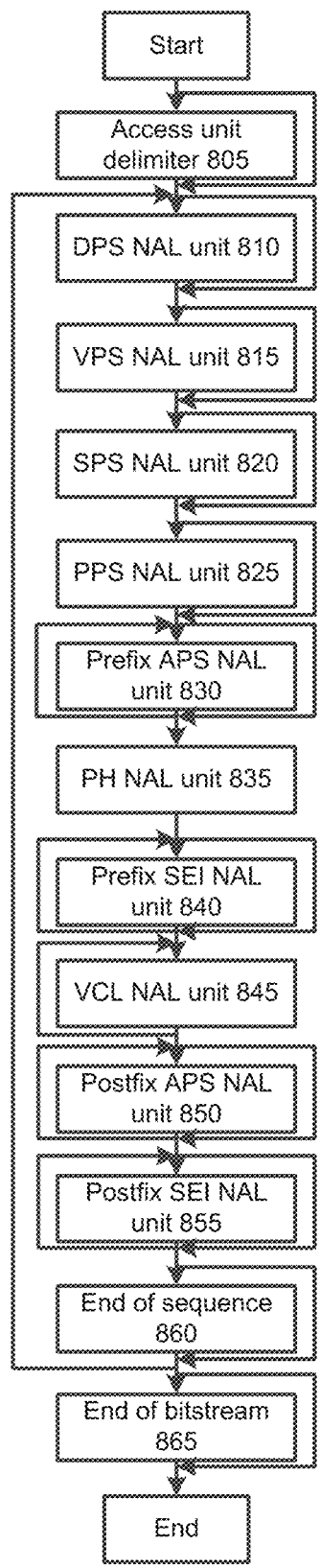
FIG. 8A is a diagram of a NAL unit structure with one PH VCL unit per PU in an AU, according to embodiments.

FIG. 8A is a diagram of a NAL unit structure with one PH VCL unit per PU in an AU, according to embodiments.

Referring to FIG. 8A, in the same or another embodiment, an AU may consist of one or more non-VCL and VCL NAL units, with the following order:
1 Access unit delimiter (AUD) NAL unit (805) (when present),
2 DPS NAL unit (810) (when present),
3 VPS NAL unit (815) (when present),
4 SPS NAL unit (820) (when present),
5 PPS NAL unit (825) (when present),
6 Prefix APS NAL unit (830) (when present),
7 PH NAL unit (835),
8 Prefix SEI NAL unit (840) (when present),
9 NAL unit with nal_unit_type equal to RSV_NVCL_26 (when present),
10 NAL unit with nal_unit_type in the range of UNSPEC28 . . . UNSPEC29 (when present).
11 one or more VCL NAL units (845),
12 Postfix APS NAL unit (850) (when present),
13 Postfix SEI NAL unit (855) (when present),
14 End of sequence (EOS) NAL unit (860) (when present)
15 End of bitstream (EOB) NAL unit (865) (when present)

When a bitstream consists of multiple layers, NAL units from the DPS NAL unit to the EOS NAL unit (except for VPS) in the above order are repeated as many as the number of layers, if present.

In the same embodiment, the order of the coded pictures and non-VCL NAL units within a PU or an AU may obey the following constraints:

When an AU delimiter NAL unit is present in an AU, it may be the first NAL unit of the AU.

The PH NAL unit in a PU may precede the first VCL NAL of the PU.

When any DPS NAL units, VPS NAL units, SPS NAL units, PPS NAL units, prefix APS NAL units, or prefix SEI NAL units are present in a PU, they may not follow the last VCL NAL unit of the PU.

When any DPS NAL units, VPS NAL units, SPS NAL units, or PPS NAL units are present in a PU, they may precede the PH NAL unit of the PU.

NAL units having nal_unit_type equal to SUFFIX_APS_NUT, SUFFIX_SEI_NUT or FD_NUT in a PU may not precede the first VCL NAL unit of the PU.

When an EOS NAL unit is present in a PU, it may be the last NAL unit among all NAL units with in the PU other than an EOB NAL unit.

When an EOB NAL unit is present in an AU, it may be the last NAL unit in the AU.

FIG. 7 is a schematic illustration of a picture header with an independent mode and a dependent mode, according to embodiments.

In one embodiment, the PHs are classified into two types; independent PH and dependent PH. The PH of an independent layer may be an independent PH. The PH of a dependent layer may be an independent PH or a dependent PH. The dependent PH of the layer k, where k>0, may reference the PH of the layer l, which is a direct reference layer of the layer k, where l<k.

In the same embodiment, when the dependent PH of the dependent layer k references the PH of the direct reference layer l of the layer k, one or more syntax elements, which are typically present in an independent PH, may not be signaled in the dependent PH of the dependent layer k. The values of the skipped syntax elements in the dependent PH of the dependent layer k are inferred to be equal to the values of the same syntax elements in the PH of the directly referenced layer l.

In the same or another embodiment, when the dependent PH of the dependent layer k references the PH of the direct reference layer l of the layer k, one or more syntax elements, which are typically present in an independent PH, may be signaled in the dependent PH of the dependent layer k. The values of the syntax elements in the dependent PH of the dependent layer k are predicted from the values of the same syntax elements in the PH of the directly referenced layer l.

In the same embodiment, when the value of the syntax element in a dependent PH is predicted from the value of the corresponding syntax element in a referenced PH, the delta value between the predicted syntax element in the dependent PH and the referenced syntax element in the referenced PH may be signaled in the dependent PH.

In the same embodiment, when the dependent layer k has multiple directly reference layers, the PH of the highest reference layer, which immediately precedes the dependent layer k in decoding order, may be the reference PH.

In the same embodiment, the referenced PH may be an independent PH in an independent layer.

In the same embodiment, the referenced PH may be an independent PH or a dependent PH in a dependent layer.

In the same embodiment, a dependent PH and its referenced PH may belong to the same access unit.

In the same embodiment, a dependent PH and its referenced PH may belong to different layers, which have direct dependency.

Referring to FIG. 7, in the same embodiment, a flag, ph_dependent_flag, in PH may indicate whether the current PH is dependent or independent. When the value of ph_dependent_flag is equal to 1, the following syntax elements may be not present in the current dependent PH. The values of the skipped syntax elements may be inferred from the values of the same syntax elements signaled in the referenced PH. When the value of ph_dependent_flag is equal to 0, all the following syntax elements may be present in the current independent PH.

In the same embodiment, the value of the PPS ID, ph_pic_parameter_set_id, in the dependent PH may be different from the value of the PPS ID in the referenced PH. When the PPS ID values are different, the values of the parameters derived from the syntax elements in PH may be different because the reference PPS are different.

In the same or another embodiment, when a dependent layer references multiple reference layers, an index in the dependent PH of the dependent layer may indicate which reference layer's PH is referenced by the current dependent PH.

In the same or another embodiment, a NAL unit type (nal_unit_type in FIG. 6) may indicate that the corresponding NAL unit contains a dependent PH.

In the same or another embodiment, a NAL unit type may indicate that the corresponding NAL unit contains an independent PH.

In one embodiment, the VCL NAL unit that follows the PH NAL unit in decoding order of the picture references the preceding PH NAL unit. When only one PH NAL unit is present in a PU, any VCL NAL unit references the PH NAL, which precedes all VCL NAL units. When multiple PH NAL units are present in a PU, any VCL NAL unit references the PH NAL, which immediately precedes the current VCL NAL unit.

Figure 8B:
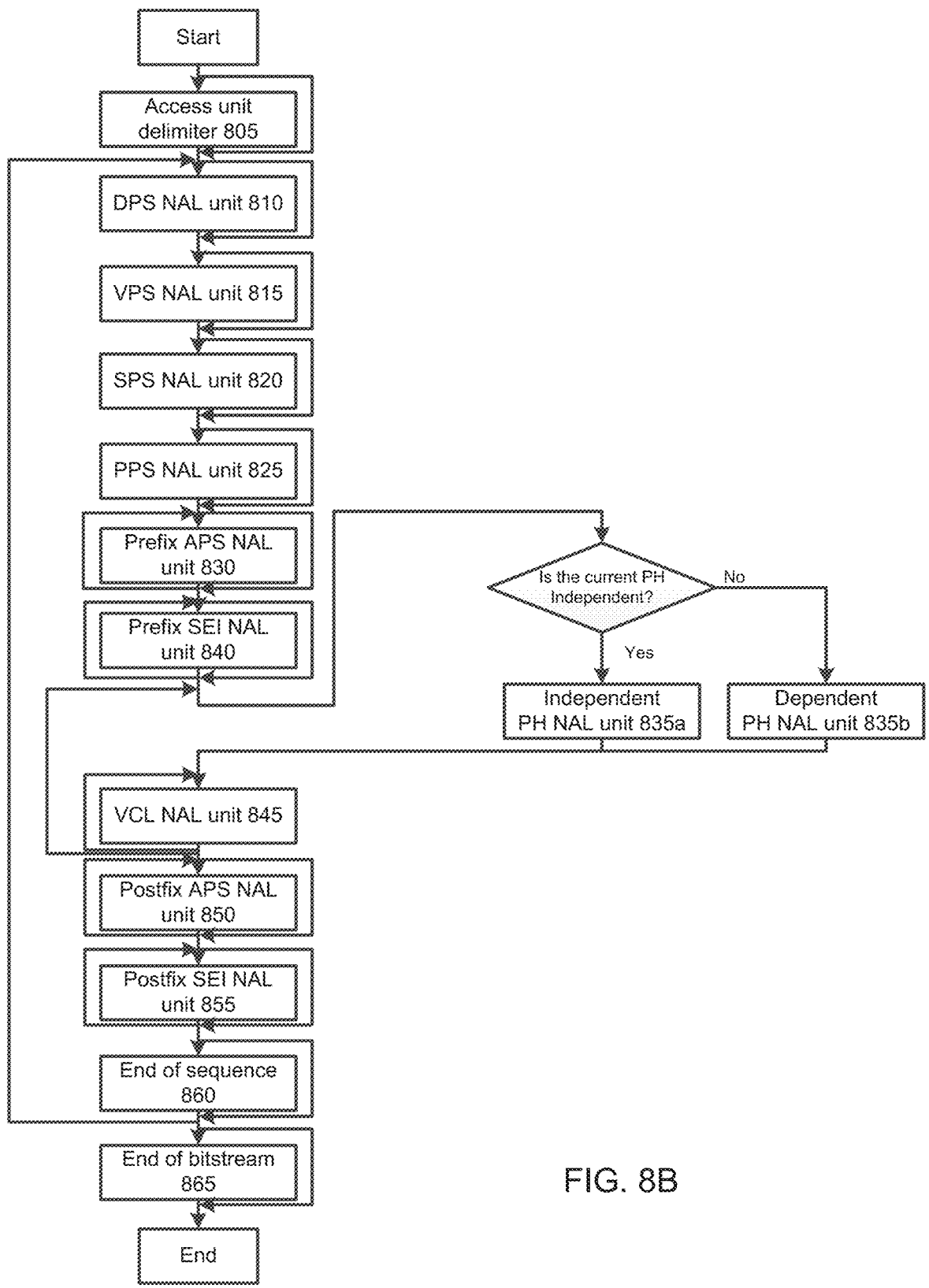
FIG. 8B is a diagram of a NAL unit structure with one independent picture header (PH) VCL unit and one or more dependent PH VCL units in a picture unit (PU) in an access unit (AU), according to embodiments.

FIG. 8B is a diagram of a NAL unit structure with one PH VCL unit and one or more dependent PH VCL units in a PU in an AU, according to embodiments.

Referring to FIG. 8B, in the same or another embodiment, an access unit may consist of one or more non-VCL and VCL NAL units, with the following order:
1 AUD NAL unit (805) (when present),
2 DPS NAL unit (810) (when present),
3 VPS NAL unit (815) (when present),
4 SPS NAL unit (820) (when present),
5 PPS NAL unit (825) (when present),
6 Prefix APS NAL unit (830) (when present),
7 Prefix SEI NAL unit (840) (when present),
8 NAL unit with nal_unit_type equal to RSV_NVCL_26 (when present),
9 NAL unit with nal_unit_type in the range of UNSPEC28 . . . UNSPEC29 (when present).
10 PH NAL unit,
  Option A: Independent PH NAL unit (835*a*)
  Option B: Dependent PH NAL unit (835*b*)
11 one or more VCL NAL units (845),
12 Postfix APS NAL unit (850) (when present),
13 Postfix SEI NAL unit (855) (when present),
14 EOS NAL unit (860) (when present)
15 EOB NAL unit (865) (when present)

When a bitstream may consist of multiple layers, NAL units from the DPS NAL unit to the EOS NAL unit (except for VPS) in the above order are repeated as many as the number of layers, if present. For each layer, a PH VCL NAL unit may be present per PU. Depending on the value of NAL unit type or a flag in PH, the PH VCL NAL unit contains an independent PH NAL unit or a dependent PH NAL unit.

Figure 8C:
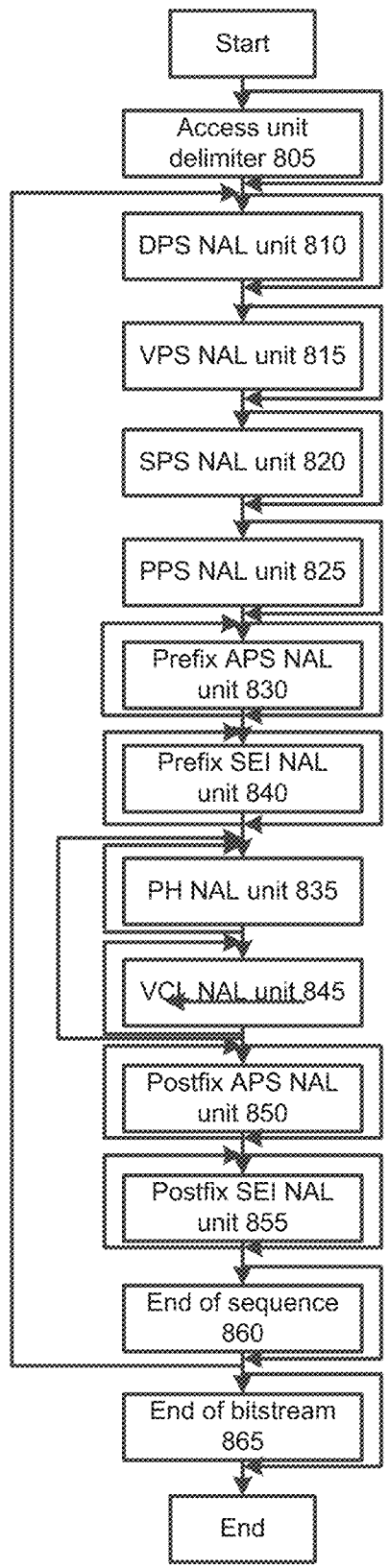
FIG. 8C is a diagram of a NAL unit structure with one or more PH VCL units per PU in an AU, according to embodiments.

FIG. 8C is a diagram of a NAL unit structure with one or more PH VCL units per PU in an AU, according to embodiments.

Referring to FIG. 8C, for each layer, grouped PH NAL units (835) and VCL NAL units (845) may be repeated.

In the same or another embodiment, one or more NAL units containing the same PH may be consecutively present before one or more VCL NAL units.

In the same embodiment, the order of the coded pictures and non-VCL NAL units within a PU or an AU may obey the following constraints:

When an AU delimiter NAL unit is present in an AU, it may be the first NAL unit of the AU.

The PH NAL unit in a PU may precede at least one VCL NAL of the PU.

When any DPS NAL units, VPS NAL units, SPS NAL units, PPS NAL units, prefix APS NAL units, or prefix SEI NAL units are present in a PU, they may not follow the last VCL NAL unit of the PU.

When any DPS NAL units, VPS NAL units, SPS NAL units, or PPS NAL units are present in a PU, they may precede the PH NAL unit of the PU.

NAL units having nal_unit_type equal to SUFFIX_APS_NUT, SUFFIX_SEI_NUT or FD_NUT in a PU may not precede the first VCL NAL unit of the PU.

When an EOS NAL unit is present in a PU, it may be the last NAL unit among all NAL units with in the PU other than an EOB NAL unit.

When an EOB NAL unit is present in an AU, it may be the last NAL unit in the AU.

In the same or another embodiment, the PPS identifier (PPS ID), which specifies the referenced PPS, may be signaled in PH. When PPS ID is present in a PH, any slice or any VCL NAL unit following the PH in the same PU or AU may reference the PPS with the PPS_ID signaled in the PH.

In the same embodiment, the PPS ID may not be present in a slice header, when the PPS_ID is signaled in the corresponding PH, which is prior to the slice in the same PU or AU. In this case, all slices in the same PU may reference the same PPS, without the changes of the syntax element values in the PPS.

Figure 8D:
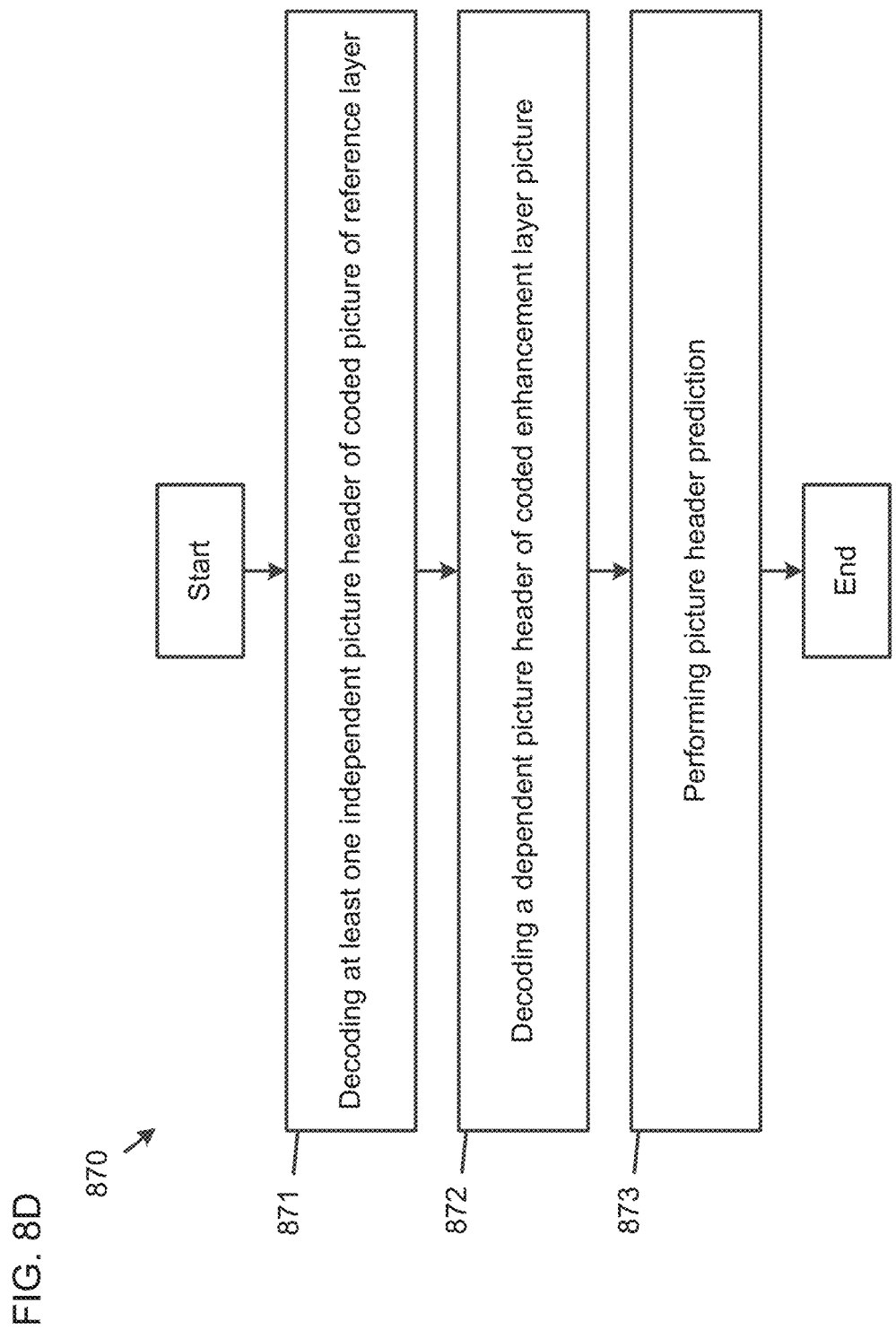
FIG. 8D is a flowchart of a method of signaling a dependent picture header and an independent picture header, according to embodiments.

FIG. 8D is a flowchart of a method (870) of signalizing a dependent picture header and an independent picture header, according to embodiments. In some implementations, one or more process blocks of FIG. 8D may be performed by the decoder (310). In some implementations, one or more process blocks of FIG. 8D may be performed by another device or a group of devices separate from or including the decoder (310), such as the encoder (303).

Referring to FIG. 8D, in a first block (871), the method (870) includes decoding at least one independent picture header of a coded picture of a reference layer, the coded picture of the reference layer being referenced by the coded enhancement layer picture.

In a second block (872), the method (870) includes decoding a dependent picture header of the coded enhancement layer picture.

In a third block (873), the method (870) includes performing picture header prediction comprising either one or both of predicting at least one value of at least one syntax element of the dependent picture header from at least one value of at least one corresponding syntax element of the at least one independent picture header, and inferring at least one value of a non-present syntax element of the dependent picture header to be equal to at least one value of a present syntax element of the at least one independent picture header.

The method (870) may further include signaling a delta value between the predicted at least one value of the at least one syntax element of the dependent picture header and the at least one value of the at least one corresponding syntax element of the at least one independent picture header.

The method (870) may further include determining that the coded picture comprises the at least one independent picture header, based on a flag of the at least one independent picture header, and determining that the coded enhancement layer picture comprises the dependent picture header, based on a flag of the dependent picture header.

The method (870) may further include determining that the coded picture comprises the at least one independent picture header, based on a unit type of the coded picture, and determining that the coded enhancement layer picture comprises the dependent picture header, based on a unit type of the coded enhancement layer picture.

The at least one independent picture header may directly precede a video coding layer in the coded picture.

The dependent picture header may directly precede a video coding layer in the coded enhancement layer picture.

Each of the coded picture and the coded enhancement layer picture may include a plurality of video coding layers and a plurality of picture headers directly preceding the plurality of video coding layers.

Although FIG. 8D shows example blocks of the method (870), in some implementations, the method (870) may include additional blocks, fewer blocks, different blocks, or differently arranged blocks than those depicted in FIG. 8D. Additionally, or alternatively, two or more of the blocks of the method (870) may be performed in parallel.

FIG. 8E is a block diagram of an apparatus (880) for signaling a dependent picture header and an independent picture header, according to embodiments.

Referring to FIG. 8E, the apparatus (880) includes first decoding code (881), second decoding code (882) and performing code (883).

The first decoding code (881) is configured to cause at least one processor to decode at least one independent picture header of a coded picture of a reference layer, the coded picture of the reference layer being referenced by the coded enhancement layer picture.

The second decoding code (882) is configured to cause the at least one processor to decode a dependent picture header of the coded enhancement layer picture.

The performing code (883) is configured to cause the at least one processor to perform picture header prediction comprising either one or both of predicting at least one value of at least one syntax element of the dependent picture header from at least one value of at least one corresponding syntax element of the at least one independent picture header, and inferring at least one value of a non-present syntax element of the dependent picture header to be equal to at least one value of a present syntax element of the at least one independent picture header.

The apparatus (880) may further include signaling code configured to cause the at least one processor to signal a delta value between the predicted at least one value of the at least one syntax element of the dependent picture header and the at least one value of the at least one corresponding syntax element of the at least one independent picture header.

The apparatus (880) may further include determining code configured to cause the at least one processor to determine that the coded picture comprises the at least one independent picture header, based on a flag of the at least one independent picture header, and determine that the coded enhancement layer picture comprises the dependent picture header, based on a flag of the dependent picture header.

The apparatus (880) may further include determining code configured to cause the at least one processor to determine that the coded picture comprises the at least one independent picture header, based on a unit type of the coded picture, and determine that the coded enhancement layer picture comprises the dependent picture header, based on a unit type of the coded enhancement layer picture.

The at least one independent picture header may directly precede a video coding layer in the coded picture.

The dependent picture header may directly precede a video coding layer in the coded enhancement layer picture.

Each of the coded picture and the coded enhancement layer picture may include a plurality of video coding layers and a plurality of picture headers directly preceding the plurality of video coding layers.

Figure 9:
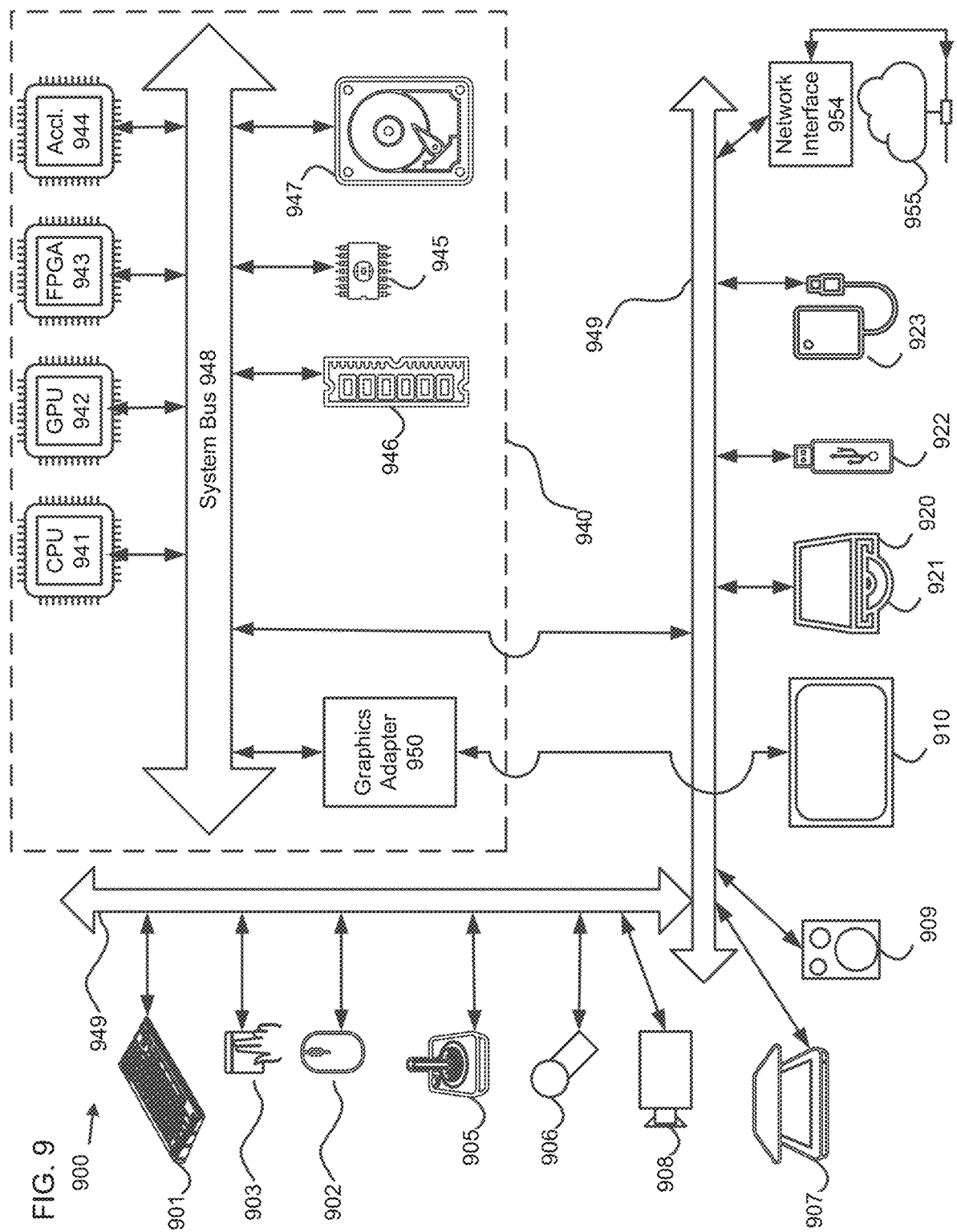
FIG. 9 is a diagram of a computer system, according to embodiments.

FIG. 9 is a diagram of a computer system (900), according to embodiments.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system (900) are examples in nature and are not intended to suggest any limitation as to the scope of use or functionality of the computer software implementing embodiments. Neither should the configuration of components be interpreted as having any dependency or requirement relating to any one or combination of components illustrated in embodiments of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove, joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove, or joystick (905), but there can also be tactile feedback devices that do not serve as input devices), audio output devices (such as: speakers (909), headphones (not depicted)), visual output devices (such as screens (910) to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). A graphics adapter (950) generates and outputs images to the touch-screen (910).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface(s) to one or more communication networks (955). Networks (955) can for example be wireless, wireline, optical. Networks (955) can further be local, wide-area, metropolitan, vehicular and industrial, real-time, delay-tolerant, and so on. Examples of networks (955) include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks (955) commonly require external network interface adapters that attached to certain general purpose data ports or peripheral buses ((949)) (such as, for example universal serial bus (USB) ports of the computer system (900); others are commonly integrated into the core of the computer system (900) by attachment to a system bus as described below (for example Ethernet interface into a PC computer system or cellular network interface (954) into a smartphone computer system). Using any of these networks (955), computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks (955) and network interfaces (954) as described above.

Aforementioned human interface devices, human-accessible storage devices, and network interfaces (954) can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (RAM) (946), internal mass storage such as internal non-user accessible hard drives, solid-state drives (SSDs), and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include peripheral component interconnect (PCI), USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several embodiments, there are alterations, permutations, and various substitute equivalents, which fall within the scope of the disclosure. It will thus be appreciated that those skilled in the art will be able to devise numerous systems and methods that, although not explicitly shown or described herein, embody the principles of the disclosure and are thus within the spirit and scope thereof.

The invention claimed is:
1. A method of reconstructing in a decoder a coded enhancement layer picture, the method being performed by at least one processor, and the method comprising:
  decoding at least one independent picture header network abstraction layer (NAL) unit of a coded picture of a reference layer, the coded picture of the reference layer being referenced by the coded enhancement layer picture;

decoding a dependent picture header NAL unit of the coded enhancement layer picture; and performing picture header prediction comprising either one or both of:

predicting at least one value of at least one syntax element of the dependent picture header NAL unit from at least one value of at least one corresponding syntax element of the at least one independent picture header NAL unit; and inferring at least one value of a non-present syntax element of the dependent picture header NAL unit to be equal to at least one value of a present syntax element of the at least one independent picture header NAL unit, wherein the at least one independent picture header NAL unit and the dependent picture header NAL unit are each an NAL unit that includes a NAL unit type syntax element that has a value indicating a picture header NAL unit.

2. The method of claim 1, further comprising signaling a delta value between the predicted at least one value of the at least one syntax element of the dependent picture header NAL unit and the at least one value of the at least one corresponding syntax element of the at least one independent picture header NAL unit.

3. The method of claim 1, further comprising determining that the coded picture comprises the at least one independent picture header NAL unit, based on a flag of the at least one independent picture header NAL unit; and determining that the coded enhancement layer picture comprises the dependent picture header NAL unit, based on a flag of the dependent picture header NAL unit.

4. The method of claim 1, further comprising determining that the coded picture comprises the at least one independent picture header NAL unit, based on a unit type of the coded picture; and determining that the coded enhancement layer picture comprises the dependent picture header NAL unit, based on a unit type of the coded enhancement layer picture.

5. The method of claim 1, wherein the at least one independent picture header NAL unit directly precedes a video coding layer NAL unit in the coded picture.

6. The method of claim 1, wherein the dependent picture header NAL unit directly precedes a video coding layer NAL unit in the coded enhancement layer picture.

7. The method of claim 1, wherein each of the coded picture and the coded enhancement layer picture comprises a plurality of video coding layer NAL units and a plurality of picture header NAL units directly preceding the plurality of video coding layer NAL units.

8. An apparatus for reconstructing in a decoder a coded enhancement layer picture, the apparatus comprising:

at least one memory configured to store computer program code; and at least one processor configured to access the at least one memory and operate according to the computer program code, the computer program code comprising:

first decoding code configured to cause the at least one processor to decode at least one independent picture header network abstraction layer (NAL) unit of a coded picture of a reference layer, the coded picture of the reference layer being referenced by the coded enhancement layer picture;

second decoding code configured to cause the at least one processor to decode a dependent picture header NAL unit of the coded enhancement layer picture; and performing code configured to cause the at least one processor to perform picture header prediction comprising either one or both of:

predicting at least one value of at least one syntax element of the dependent picture header NAL unit from at least one value of at least one corresponding syntax element of the at least one independent picture header NAL unit; and inferring at least one value of a non-present syntax element of the dependent picture header NAL unit to be equal to at least one value of a present syntax element of the at least one independent picture header NAL unit, wherein the at least one independent picture header NAL unit and the dependent picture header NAL unit are each an NAL unit that includes a NAL unit type syntax element that has a value indicating a picture header NAL unit.

9. The apparatus of claim 8, further comprising signaling code configured to cause the at least one processor to signal a delta value between the predicted at least one value of the at least one syntax element of the dependent picture header NAL unit and the at least one value of the at least one corresponding syntax element of the at least one independent picture header NAL unit.

10. The apparatus of claim 8, further comprising determining code configured to cause the at least one processor to:

determine that the coded picture comprises the at least one independent picture header NAL unit, based on a flag of the at least one independent picture header NAL unit; and determine that the coded enhancement layer picture comprises the dependent picture header NAL unit, based on a flag of the dependent picture header NAL unit.

11. The apparatus of claim 8, further comprising determining code configured to cause the at least one processor to:

determine that the coded picture comprises the at least one independent picture header NAL unit, based on a unit type of the coded picture; and determine that the coded enhancement layer picture comprises the dependent picture header NAL unit, based on a unit type of the coded enhancement layer picture.

12. The apparatus of claim 8, wherein the at least one independent picture header NAL unit directly precedes a video coding layer NAL unit in the coded picture.

13. The apparatus of claim 8, wherein the dependent picture header NAL unit directly precedes a video coding layer NAL unit in the coded enhancement layer picture.

14. The apparatus of claim 8, wherein each of the coded picture and the coded enhancement layer picture comprises a plurality of video coding layer NAL units and a plurality of picture header NAL units directly preceding the plurality of video coding layer NAL units.

15. A non-transitory computer-readable storage medium storing instructions that cause at least one processor to:

decode at least one independent picture header network abstraction layer (NAL) unit of a coded picture of a reference layer, the coded picture of the reference layer being referenced by a coded enhancement layer picture;

decode a dependent picture header NAL unit of the coded enhancement layer picture; and perform picture header prediction comprising either one or both of:

predicting at least one value of at least one syntax element of the dependent picture header NAL unit from at least one value of at least one corresponding syntax element of the at least one independent picture header NAL unit; and inferring at least one value of a non-present syntax element of the dependent picture header NAL unit to be equal to at least one value of a present syntax element of the at least one independent picture header NAL unit, wherein the at least one independent picture header NAL unit and the dependent picture header NAL unit are each an NAL unit that includes a NAL unit type syntax element that has a value indicating a picture header NAL unit.

16. The non-transitory computer-readable storage medium of claim 15, wherein the instructions further cause the at least one processor to signal a delta value between the predicted at least one value of the at least one syntax element of the dependent picture header NAL unit and the at least one value of the at least one corresponding syntax element of the at least one independent picture header NAL unit.

17. The non-transitory computer-readable storage medium of claim 15, wherein the instructions further cause the at least one processor to:

determine that the coded picture comprises the at least one independent picture header NAL unit, based on a flag of the at least one independent picture header NAL unit; and determine that the coded enhancement layer picture comprises the dependent picture header NAL unit, based on a flag of the dependent picture header NAL unit.

18. The non-transitory computer-readable storage medium of claim 15, wherein the instructions further cause the at least one processor to:

determine that the coded picture comprises the at least one independent picture header NAL unit, based on a unit type of the coded picture; and determine that the coded enhancement layer picture comprises the dependent picture header NAL unit, based on a unit type of the coded enhancement layer picture.

19. The non-transitory computer-readable storage medium of claim 15, wherein the at least one independent picture header NAL unit directly precedes a video coding layer NAL unit in the coded picture.

20. The non-transitory computer-readable storage medium of claim 15, wherein the dependent picture header NAL unit directly precedes a video coding layer NAL unit in the coded enhancement layer picture.

\* \* \* \* \*